United States Patent
Sneyers et al.

(10) Patent No.: US 11,562,506 B2
(45) Date of Patent: Jan. 24, 2023

(54) SYSTEM, DEVICE, AND METHOD FOR DETERMINING COLOR AMBIGUITY OF AN IMAGE OR VIDEO

(71) Applicant: CLOUDINARY LTD., Petah Tikva (IL)

(72) Inventors: Jon Philippe D. Sneyers, Asse (BE); Tal Lev-Ami, Modiin (IL)

(73) Assignee: CLOUDINARY LTD., Petah Tikva (IL)

( * ) Notice: Subject to any disclaimer, the term of this patent is extended or adjusted under 35 U.S.C. 154(b) by 426 days.

(21) Appl. No.: 16/711,479

(22) Filed: Dec. 12, 2019

(65) Prior Publication Data

US 2021/0183105 A1    Jun. 17, 2021

(51) Int. Cl.
*G06T 7/90* (2017.01)
*G06T 11/00* (2006.01)
*G06T 5/00* (2006.01)
G06F 40/18 (2020.01)
H04N 9/64 (2006.01)

(52) U.S. Cl.
CPC ............... *G06T 7/90* (2017.01); *G06T 5/007* (2013.01); *G06T 11/001* (2013.01); *G06F 40/18* (2020.01); *G06T 2207/10024* (2013.01); *G06T 2207/30176* (2013.01); *H04N 9/64* (2013.01)

(58) Field of Classification Search
CPC ......... G06T 7/90; G06T 5/007; G06T 11/001; G06T 2207/10024; G06T 2207/30176; G06F 40/18; H04N 9/64
See application file for complete search history.

(56) References Cited

U.S. PATENT DOCUMENTS

| | | | | |
|---|---|---|---|---|
| 5,552,842 | A * | 9/1996 | Ginsburg | G06T 5/10 351/239 |
| 8,406,528 | B1 * | 3/2013 | Hatwich | G06T 7/13 382/199 |
| 9,288,531 | B2 * | 3/2016 | Woods | H04N 21/44226 |
| 10,109,092 | B1 * | 10/2018 | Hitchings, Jr. | G06T 11/60 |
| 10,957,086 | B1 * | 3/2021 | Mathon | G06N 5/022 |
| 2005/0071743 | A1 * | 3/2005 | Harrington | G06F 16/382 707/E17.097 |
| 2012/0147163 | A1 * | 6/2012 | Kaminsky | G09G 5/028 345/590 |

(Continued)

*Primary Examiner* — Sean T Motsinger
(74) *Attorney, Agent, or Firm* — Browdy and Neimark, PLLC (57) ABSTRACT

Systems, devices, and methods for determining color ambiguity of images or videos. A system includes a color ambiguity score generator, which analyzes an image and determines a color ambiguity score that quantitively indicates a level of color ambiguity that the image is estimated to cause when viewed by a user having color vision deficiency. A local color ambiguity score is generated to quantitively indicate a level of local color ambiguity between (i) an in-image object and (ii) an in-image foreground of that in-image object. A global color ambiguity score is generated to quantitively indicate a level of global color ambiguity between (I) a first in-image object within the image and (II) a second in-image object within that image. The color ambiguity score generator generates the color ambiguity score by utilizing a formula that uses both (A) the local color ambiguity score and (B) the global color ambiguity score.

26 Claims, 1 Drawing Sheet

(56) References Cited

U.S. PATENT DOCUMENTS

| | | | |
|---|---|---|---|
| 2014/0270516 A1* | 9/2014 | Wang | G06T 5/50 |
| | | | 382/167 |
| 2016/0148354 A1* | 5/2016 | Finlayson | G06T 7/90 |
| | | | 382/164 |
| 2020/0372690 A1* | 11/2020 | Silveria | G06T 7/90 |
| 2021/0183105 A1* | 6/2021 | Sneyers | G06T 11/001 |
| 2021/0358182 A1* | 11/2021 | Ward | G06V 10/25 |

* cited by examiner

SYSTEM, DEVICE, AND METHOD FOR DETERMINING COLOR AMBIGUITY OF AN IMAGE OR VIDEO

FIELD

The present invention relates to communication systems and electronic devices.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like.

Some activities that are performed via an electronic device, involve consumption of digital content presented in color. For example, a user may send to his friend a color photograph that he captured with his smartphone, or may watch on his laptop computer an action movie presented in color, or may view on his tablet a color drawing that his friend created and shared via a social network website or application.

SUMMARY

Some embodiments of the present invention may provide systems, devices, and methods for determining color ambiguity of an image or a video. For example, a system includes a color ambiguity score generator, which analyzes an image and determines a color ambiguity score that quantitively indicates a level of color ambiguity that the image is estimated to cause when viewed by a user having color vision deficiency. A local color ambiguity score is generated to quantitively indicate a level of local color ambiguity between (i) an in-image object and (ii) an in-image foreground of that in-image object. A global color ambiguity score is generated to quantitively indicate a level of global color ambiguity between (I) a first in-image object within the image and (II) a second in-image object within that image. For example, the first and second in-image objects may be adjacent or neighboring to each other, or may be touching each other, or may be nearby each other yet not touching or not bordering each other, or may be partially overlapping or hiding one another, or may be non-touching or non-adjacent to each other such that there is at least one pixel or several pixels that separate between them as another in-image object or as a background color of that image or as other type of in-image visual gap between the two in-image objects). The color ambiguity score generator generates the color ambiguity score by utilizing a formula that uses both (A) the local color ambiguity score and (B) the global color ambiguity score.

The present invention may provide other and/or additional advantages and/or benefits.

DETAILED DESCRIPTION OF SOME DEMONSTRATIVE EMBODIMENTS

The Applicants have realized that a portion of the population suffers from (or is affected by) color blindness or color vision deficiency, or a decreased ability to see color(s) or to differentiate among colors. It is estimated that approximately 8.5 percent of the male population, as well as approximately 0.4 percent of the female population, has some degree of color blindness or color vision deficiency. The Applicants have realized that more common types of color blindness are, for example, protanopia, deuteranopia, protanomaly, and deuteranomaly; and that these types of color blindness are often characterized by reduced ability of a person to distinguish or differentiate between red and green, or between one or more shades or hues of red (e.g., light red) and one or more shades or hues of green (e.g., dark green). Additionally or alternatively, people that suffer from some degree of color blindness may sometimes be incapable of distinguishing between purple and blue, or between cyan and white, or between (or among) other pairs or groups of colors.

The Applicants have realized that color images, color videos, and other types of color content-items (e.g., animations, presentations, or the like) often utilize colors to convey meaning and/or to enrich the user experience; yet the processes and/or the systems and/or the human users that are involved in creating or generating or serving such content may not be aware that the color content that they create or generate or serving may not be correctly decoded or viewed by color blinded persons or by persons that suffer from some degree of color vision deficiency.

In a first example, user Alice is preparing a business presentation indicating that 70% of sale pitches last year successful, and that 30% of the sale pitches were unsuccessful. User Alice utilizes a presentation-creation or slides-creation or image editing application or platform, to create or to generate a representation of a pie chart of which a 70% slice is dark green and a 30% slice is light red. User Alice may publish or send or present such image or slide or presentation, without being aware that this particular color combination at this particular arrangement may be difficult or even impossible for some color-blind viewers to correctly understand or visually decode.

In a second example, user Bob utilizes a word processing application and/or an image editing application to create a banner advertisement with the text "Click Here Now" shown in orange font over a green background. User Bob may publish or utilize such banner advertisement, and an advertising platform may serve it as a valid advertising banner, even though it is possible that several percent of the male viewers would not be able to see or read the text due to this choice of colors, and/or would have increased difficulty (e.g., would require an effort and a longer time) to process and read such banner advertising.

In a third example, user Carl prepares a printed brochure or flyer which depicts an image of a website with hyperlinks, and uses blue font to indicate hyperlinks that were not yet visited, and uses purple font to indicate hyperlinks that were already visited. User Carl is not aware that such printed brochure or flyer may be more difficult for some color-blind persons to visually comprehend, due to their inability or reduced ability to distinguish between blue and purple.

The Applicants have realized that there is a need to adapt, update and/or modify various electronic systems as well as digital content and non-digital content, to a world in which an important portion of the population suffers from (or is affected by) some degree of color blindness or color vision deficiency.

The Applicants have realized that it may be beneficial that an electronic or computerized system or device would be capable of automatically determining or detecting that a particular content-item (e.g., image, photograph, slide, animation sequence, video, video frame, or the like) contains content that is estimated to be difficult or impossible for color-blind persons to see and/or to comprehend and/or to notice; and would further be capable to automatically perform one or more mitigation operations to cure or to reduce an automatically-detected color ambiguity of a content-item.

In accordance with some embodiments of the present invention, such automatic determination or detection may be incorporated or added or built-in into a variety of computerized systems or platforms or applications, for example, image creation applications or platforms, image editing applications or platforms, video editing applications or platforms, video creation applications or platforms, applications or platforms that perform processing and/or serving and/or publishing and/or saving and/or storing and/or editing and/or converting and/or encoding of content-items, applications or platforms for displaying or presenting or performing playback of content (e.g., image display applications, presentation applications, video playback application, web browsers, image browsers, or the like); as well as stand-alone or integrated devices for creating or capturing color content, e.g., a stand-alone digital camera, a smartphone having a camera, a tablet having a camera, a laptop computer having a camera, a desktop computer equipped with a camera or a camera accessory, a gaming device having a camera, a smart-watch having a camera, a Virtual Reality (VR) or Augmented Reality (AR) unit or headgear or helmet or glasses or other gear, a smart television, an Internet-connected television or screen or display unit; a system or platform for advertising or marketing, and/or other suitable devices, systems, applications and/or platforms. In some embodiments, such capabilities may be built-in into the application or platform; or, may be added or provided as a supplemental module or unit, for example, a plug-in, an extension, an add-on, a filter, an additional process or menu or menu-item in an application, an additional functionality in an application or platform, an extension or plug-in or add-on to a Web-browser or to a mobile application or mobile "app" or to a desktop application or a desktop "app", a stand-alone software component and/or hardware component, or the like.

In accordance with some embodiments of the present invention, some devices, systems, applications and/or platforms may automatically and/or autonomously detect that a particular content-item is estimated to be color ambiguous to some viewers, or that a particular content-item is characterized by color ambiguity that may disturb or confuse or even mislead some viewers; and that further to such detection, the relevant devices, systems, applications and/or platforms would perform one or more suitable actions or operations or processes, for example: generating a warning notification or an alert message to the content owner or the content publisher or the content creator (or to other relevant entity); removing or discarding such content-item; temporarily pausing or stopping or ceasing the utilization of such content-item (e.g., in an advertising campaign or in an advertising or publishing platform); quarantining such content-item in a quarantined storage region for further review and handling; automatic or manual replacement of such content-item with another (equivalent, or non-equivalent) content-item (e.g., replacing Banner Ad number 173 of Publisher 16, with Banner Ad number 174 of Publisher 16, while quarantining Banner Ad number 173 until its further review or correction); automatically performing one or more image editing or content editing operations which are estimated to reduce or to cure the color ambiguity of the content-item, e.g., automatic modification or changing or replacement of colors or contrast or hue or saturation or brightness; automatic cropping or re-sizing of image-portions or text, which may sometimes assist in distinguishing colors; automatic underlining or bolding of text; automatic dropping or discarding of a particular frame or frame-set from a video or from an animation sequence; automatic insertion or injection of content or changes into an image, such as insertion of a visual space to separate between or among similarly-colored image-portions such as the two colored pie chart portions; and/or other suitable operations.

Figure 1:
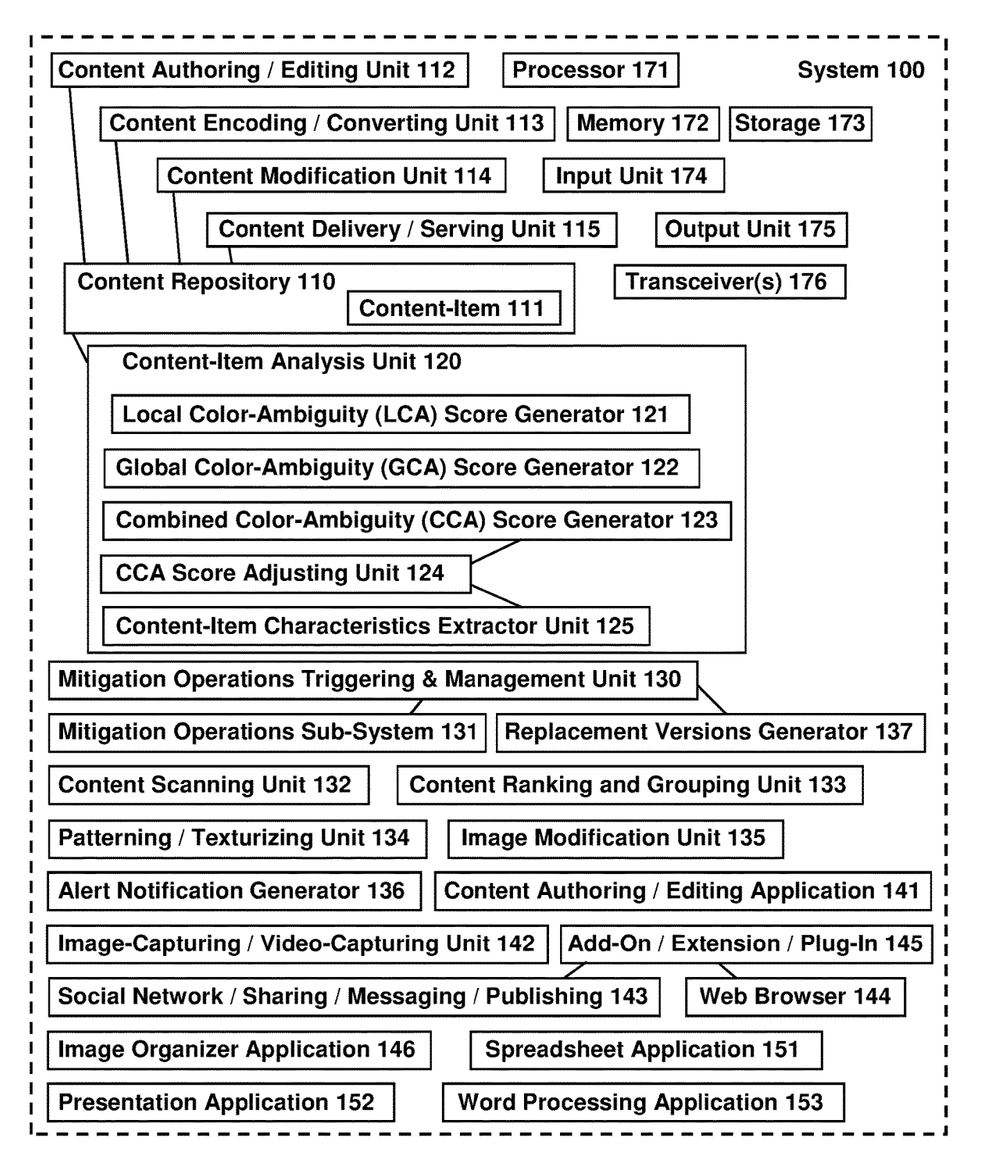
FIG. 1 is a block-diagram illustration of a system, in accordance with some demonstrative embodiments of the present invention.

Reference is made to FIG. 1, which is a schematic block-diagram illustration of a computerized system 100, in accordance with some demonstrative embodiments of the present invention. System 100 may comprise, or may be implemented by using, hardware components and/or software components; and/or may be implemented as a single or stand-alone device or apparatus, or as part of a platform of multiple devices; and/or as part of a cloud-based service or a "Software as a Service" platform, or as part of a cloud-computing platform; or may be part of a content storage platform or network or repository, or a content delivery network (CDN), or a content serving platform or network; or may be part of a content authoring or creating or editing platform; or may be part of a content conversion or re-formatting or encoding or processing platform; or may be implemented using client/server architecture, or using peer-to-peer architecture or distributed architecture or other suitable architecture.

System 100 may comprise, or may have access to, a Content Repository 110 able to store one or more content items, or a plurality of content items. A content-item 111 may be stored in the Content Repository, for one or more purposes. For example, a Content Authoring/Editing Unit 112 may enable to author or create a new content-item, and/or to edit or modify an already-created content item. Similarly, a Content Encoding/Converting Unit 113 may optionally perform operations of encoding or re-encoding or trans-coding or converting a content item between different formats or file-formats (e.g., converting from BMP to JPG, or converting from TIFF to PNG. Additionally or alternatively, a Content Modification Unit 114 may optionally perform other operations that cause modification of a content depicted in the content-item (e.g., re-sizing, cropping, or the like) and/or that cause modification to other attributes of the content-item (e.g., changing a compression level of a JPG image). Optionally a Content Delivery/Serving Unit 115 may handle the serving or delivery or transmitting of content item(s) to one or more recipient(s) or recipient device(s) or recipient entities, for example, as part of serving a web-page, as part of serving content to an application or an "app", as part of publishing content via a social network, or the like. Such units (112, 113, 114, 115) may thus have access to Content-Item 111 for various such purposes, and/or may optionally modify Content-Item 111, and/or may optionally create copies or backup or additional versions (e.g., modified versions) of Content-Item 111 for various such purposes.

System 100 may comprise a Content-Item Analysis Unit 120, which operates to analyze content-item 111 and to determine its color ambiguity score or level. In a demonstrative embodiment, Content-Item Analysis Unit 120 may comprise three sub-units or modules: (i) a Local Color-Ambiguity (LCA) Score Generator 121, which generates an LCA Score for content-item 111; and (ii) a Global Color-Ambiguity (GCA) Score Generator 122, which generates a GCA Score for that content-item 111; and (iii) a Combined Color-Ambiguity (CCA) Score Generator 123, which generates a CCA Score for that content-item 111.

The LCA Score Generator 121 determines the LCA Score, indicating the extent or the severity or the confidence that the following condition holds true: that the foreground color in Content-Item 111 cannot be distinguished from the background color in Content-Item 111, such that the presence (or shape, or dimensions, or existence, or borders, or characteristics) of an object that is depicted in Content-Item 111 cannot be detected (at all, or easily, or efficiently, or effortlessly or with certainty) by a colorblind person (or, may require increased effort and/or increased time for a person having color vision deficiency to comprehend).

The GCA Score Generator 122 determines the GCA Score, indicating the extent or the severity or the confidence that the following condition holds true: that two or more objects that are depicted in Content-Item 111 (e.g., two slices in a pie chart) can only be distinguished or referenced by (or based on) their color, and their colors cannot be distinguished (at all, or easily, or efficiently, or effortlessly, or with certainty) by a colorblind person (or, may require increased effort and/or increased time for a person having color vision deficiency to comprehend.

The CCA Score Generator 123 determines the CCA Score, which indicates the overall or the combined color-ambiguity level of content-item 111, based on a pre-defined formula that is based on the LCA score on the GCA scores of that content-item 111. For example, the CCA Score may be an aggregation of the LCA and GCA scores; or, may be a product of multiplying the LCA and GCA score; or may be their arithmetic mean or arithmetic average; or may be their geometric mean or geometric average; or may be generated by utilizing particular coefficients and/or weighting components and/or mathematical operations (e.g., three times the LCA plus five times the GCA); or may be otherwise determined by taking into account at least the GCA score and the LCA score.

In some embodiments, optionally, the CCA score may take into account other and/or additional attributes or data, or may adjust the CCA score based on other characteristics of the content-item; for example, by modifying the CC score based on the size (in pixels) of the content-item, and/or based on the type of content-item (e.g., a single stand-alone image, or an image that is a frame out of a video or out of an animation sequence); or, an image intended for on-screen display at 72 DPI, or an image intended for printing at 600 DPI); or, based on the application that is utilized to display the content-item (e.g., adjusting or differently modifying a CCA score for a web browser, or for a presentation application). Such adjustments of the CCA score may be performed as an integral part of the CCA Score Generator 123; or, may be implemented via a CCA Score Adjusting Unit 124 which performs such adjustments to a "raw" or initial CCA score, based on one or more attributes or characteristics that are extracted or determined by a Content-Item Characteristics Extractor Unit 125 (e.g., which may be part of the Content-Item Analysis Unit 120, or may be associated therewith).

In a demonstrative embodiment, each one of the LCA score, the GCA score, and the CCA score, is a non-negative number (e.g., being a positive number or zero). A greater value of such score(s), indicates a greater level of color-ambiguity of the content-item. A value of zero indicates that the content-item has no color ambiguity; for example, in some implementations, a black-and-white (only) image (e.g., a black circle on a white background) would have a GCA score of zero, and an LCA score of zero, and a CCA score of zero. A color-ambiguity score (LCA or GCA or CCA score) that is close to zero (e.g., smaller than 0.20, or smaller than 0.25, or smaller than a pre-defined threshold T1) may indicate that the content-item has a very low level of color ambiguity but can still be regarded (and handled) as an unambiguous content-item.

Conversely, color-ambiguity score (LCA or GCA or CCA score) that is greater than another pre-defined threshold T2 (such as: greater than 1.0, or greater than 0.85, or greater than 1.20), may indicate that the content-item has a great or excessive level of color ambiguity that is expected to be problematic to color-blind persons or to viewers having color vision deficiency, or otherwise indicating that the content-item should be considered (and handled as) a problematically color-ambiguous content-item or as a problematically ambiguous content-item or as an excessively ambiguous content-item.

In a first example, an image of an Ishihara color blindness test plate (or an image of similar Pseudo-Isochromatic Plate or "PIP") may cause system 100 to generate an LCA score value above 2, and a GCA score value above 2, and a CCA score value that is typically greater than 4 or 5.

In a second example, an image of a green circle on red background, particularly where the shades of green and red are problematic for distinguishing by color-blind persons, people) may cause system 100 to generate a high LCA score value (e.g., greater than 1), and a high GCA score value (e.g., greater than 1), and a high CCA score value (e.g., greater than 2).

In a third example, an image that depicts a green circle and a separate (non-touching, non-bordering, non-overlapping) red circle, both circles placed on a white background, may cause system 100 to generate a high GCA score value (e.g., greater than 1), and an LCA score value of zero, and a high CCA score value (e.g., greater than 1) which indicates that the overall extent of color ambiguity of this image should be regarded as problematic or excessive.

In a fourth example, an image that depicts a three-signal traffic light, in which the particular shades or hues or red and orange and green are difficult for distinguishing by a color-blind person, may cause system 100 to generate a high GCA score value (e.g., greater than 1), and a non-zero yet relatively low GCA score (e.g., smaller than 1), and a high CCA score value (e.g., greater than 1) which indicates that the overall extent of color ambiguity of this image should be regarded as problematic or excessive.

In a fifth example, an image that depicts a red pepper placed on top of a green salad, may cause system 100 to generate a very low GCA score value (e.g., smaller than 1), and a high LCA score (e.g., greater than 1), and a high CCA score value (e.g., greater than 1) which indicates that the overall extent of color ambiguity of this image should be regarded as problematic or excessive.

In some embodiments, a determination that the CCA score of content-item 111 is greater than a particular threshold CT, and/or a determination that the LCA score of content-item 111 is greater than a particular threshold LT, and/or a determination that the GCA score of content-item 111 is greater than a particular threshold GT, optionally in combination with taking into account other characteristics or attributes of the content-item, may cause a Mitigation Operations Triggering & Management Unit 130 to trigger or to initiate one or more pre-defined operations with regard to content-item 111 due to its estimated level of color ambiguity; and such mitigation operations may be performed by one or more local and/or co-located and/or remote units or devices, which may be implemented as Mitigation Operations Sub-System 131.

Optionally, a Content Scanning Unit 132 may operate to batch analyze a plurality of images or content-items stored in the Content Repository 110, feeding each content-item (separately) into the Content-Item Analysis Unit 120, such that a GCA score and an LCA score and a CCA score are generated for each such content-item. The CCA score values (and optionally, the underlying LCA and GCA score values) for each content-item may be stored as an additional record in a database, or as a field in an existing record, or may be added to meta-data or descriptors of each content-item, or may be stored in a linked list or a linked table or a linked database that indicates the CCA (and optionally LCA and/or GCA) scores for each such content-item.

Optionally, a Content Ranking and Grouping Unit 133 may operate to rank or order or re-order or group or re-group content-items, based on their CCA score values; for example, grouping in a first group the content-items that have a CCA score of zero and are thus clearly suitable for utilization; grouping in a second group the content-items that have a CCA score within a particular range (e.g., greater than 5), which should be quarantined or discarded or reviewed or replaced, or should be prevented from being served or used or published until manual correction or manual confirmation by an administrator; grouping in a third group the content-items that have a CCA score within another particular range (e.g., between 0.3 and 0.99), which would trigger a recommendation to the content-owner to consider manual replacement of the content-item or to consider fixing or modification of the content-item to avoid or to remove or to reduce its color ambiguity, or other suitable alert notification or recommendation.

In some embodiments, optionally, the Content Ranking and Grouping Unit 133 may also determine additional analytics with regard to a cluster or a corpus of content-items; for example, generating an insight that 15 percent of images from a particular author have a problematic or excessive CCA score, or that 20% of banner advertisement from a particular advertiser have a problematic or excessive CCA score, or the like. Such aggregated analytics may be used to rank or to estimate the quality of a corpus of images or advertisements or content-items, that are associated with a particular source or owner, or that are intended for delivery or transmittal or serving or publishing, or the like.

Other rules may be utilized and enforced for the purpose of ranking or grouping content-items based on their color ambiguity scores, and for initiating or triggering one or more actions with regard to each such group of content-items, or with regard to content-items having a CCA score that is within a particular range-of-values or that is greater than a particular threshold value.

Referring now again to the Mitigation Operations Sub-System 131, one or more suitable mitigation operations may be initiated or triggered or launched or executed, based on the CCA score of a content-item. For example, an Alert Notification Generator 136 may automatically generate and/or send and/or transmit an alert notification message, which may be addressed and/or delivered to an administrator of system 100 and/or to a user of system 100 and/or to the owner or publisher or author or creator or uploader of content-item 111, and/or to a co-located or remote entity or server which may intend to utilize the content-item 111 (e.g., a web server, an application server, a CDN element or unit, a storage system or repository). The notification message may alert the recipient that a particular content-item was analyzed and was determined to be problematic for viewing by colorblind persons. Optionally, the message may indicate or may include the CCA score, or a quantitative indication of the severity of the detected problem. For example, a CCA score of 0.37 may cause the message to report that the content-item was determined to be "slightly problematic" for colorblind viewers; whereas, a CCA score of 5.8 may cause the message to report that the content-item was determined to be "extremely problematic" for colorblind viewers. The message may optionally include one or more proposals for modifying the content-item or for replacing it, and/or may include (or may link to) one or more GUI elements or hyperlinks that would allow automatic modification of the content-item. In some embodiments, optionally, the message may already include one or more automatically-generated modified versions of the original content-item, and may invite the recipient to select one of the proposed modified versions as an approved replacement to the original content-item; and upon the recipient's approval, the system may automatically perform such replacement of the original color-ambiguous content-item with the modified version thereof which the user has approved.

In some embodiments, optionally, as a mitigation process or a remedial process or as a curing process for color-ambiguous images or content-items, a Patterning/Texturizing Unit 134 may operate on a color-ambiguous image, may identify that the content-item is a pie chart having a red slice and a green slice, e.g., via computer vision algorithms, or image recognition algorithms; or by using Optical Character Recognition (OCR) of the label "Pie Chart" that appears under the pie chart in the image; or using Natural Language Processing (NPL) and/or contextual analysis of text (e.g., content-item has a file-name of "Pie-Chart.JPG", or "Green-Red-Pie-Chart.PNG"); and may operate to transform or modify the depicted pie chart by adding unique or different textures or patterns to each slice therein; such that, for example, the green slice would have horizontal lines, whereas the red slice would have vertical lines or diagonal lines or a dotted pattern.

In another example, an Image Modification Unit 135 may automatically perform one or more image modification operations on the color-ambiguous content-item, with a purpose to remove or to cure or to reduce its color ambiguity. Such operations may include, for example: automatic modification or changing or replacement of colors or contrast or hue or saturation or brightness; automatic cropping or re-sizing of image-portions or text, which may sometimes assist in distinguishing colors; automatic underlining or bolding of text, or changing text font and/or font size and/or font type and/or bold and/or italics and/or underline properties (e.g., the original content-item includes a word in red and a word in green, both of them with font Arial size 12; and the modification may change the red word from being in Arial size 12 to being in Times New Roman italics size 13); automatic dropping or discarding of a particular frame or frame-set from a video or from an animation sequence; automatic insertion or injection or adding of content or changes into an image, such as insertion of a visual space to separate between or among similarly-colored image-portions such as the two colored pie chart portions; rotating or changing or increasing or decreasing the hue or saturation or color-levels of an entire image, or only at particular portion(s) or region(s) of an image; selectively modifying or setting or adjusting luminosity or contrast; adding dots or patterns or textures or stripes to particular image-regions or objects in the image; reducing the number of colors in the image or changing the color-depth of the image (e.g., from 16-bit color depth to 8-bit color depth; from 65,536 colors to 256 colors); applying one or more image-editing filters to an image, such as a "Sharpen Edges" filter or a "Black Contour" filter that may help to distinguish between objects or between an object and a background; and/or other suitable operations.

Such modifications of the original content-item may be managed or handled or performed or orchestrated by a Replacement Versions Generator 137, which may be configured to prepare one or more, or N, replacement versions for an original content-item, by applying to the original content-item different methods of modification. For example, a first replacement version may be generated by different patterning of slices as described above; a second replacement version may be generated by insertion of in-content spacing or in-content separation between the depicted objects or elements; a third replacement version may be generated by replacing all green colors with blue colors in an image; a fourth replacement version may be generated by increasing the brightness and/or increasing the contrast level of an image; a fifth replacement version may be generated by changing font type and/or font size and/or font effects of a particular textual component of an image or of a content-item; or the like. The one or more modified versions or replacement versions may then be stored in Content Repository 110; and/or may be presented for approval by an administrator or a user of system 100, or by the entity that owns or published or submitted or uploaded or created the original content-item.

In some embodiments, system 100 may be configured to automatically select one of the modified versions and to utilize it instead of using the original content item, or to perform automatic replacement of the original content item with a particular automatically-modified version thereof; for example, optionally, each one of several automatically-modified versions of the original content-item, may be fed to the Content-Item Analysis Unit 120 for generation of new CCA scores for the modified versions. For example, the original content-item was analyzed and was determined to have a CCA score of 4.5; the system proceeded to automatically generate three modified versions of the original content-item; each one of those modified versions is evaluated by itself, and these three modified versions are determined to have CCA scores of 4.2 and 1.8 and 0.3, respectively; and the system may then automatically select the modified version that has the smallest CCA score as the replacement for the original content-item (e.g., optionally by also checking if the replacement image has a CCA score that is smaller than a pre-defined threshold). Other content replacement methods may be used.

Referring now again to Content-Item Analysis Unit 120, its units (and particularly, units 121, 122, 123) may be implemented in a variety of ways by using one or more suitable algorithms or calculations. For demonstrative purposes, the following discussion demonstrates a non-limiting example of operations that may be performed by Content-Item Analysis Unit 120 and its units.

For example, the Global Color-Ambiguity (GCA) Score Generator 122 may operate in accordance with the following method. Firstly, a three-dimensional array of counters c [10] [3] [4] is initialized to store all zero values. A counter p is initialized or reset to zero. A constant LMR is defined as, for example, LMR=0.39826875348.

Then, all pixels of an image are analyzed; either in their original order, or (in some implementations) at any suitable order as long as all the pixels of the image are analyzed. For example, the R, G, B values of each pixel (e.g., of a Red, Green, Blue color-space) are converted or transformed into corresponding L, M, S values (e.g., of a Long, Medium, Short color-space), using a suitable conversion or transformation method (e.g., using a Hunt-Pointer-Estevez transformation matrix or MHPE), with the range of 0 . . . 1 for the L, M, S values. Additionally, the Luma value Y is computed; such as, in accordance with ITU Recommendation BT.601 titled "Studio encoding parameters of digital television for standard 4:3 and wide screen 16:9 aspect ratios" (March 2011, available at <ITU.int/rec/R-REC-BT.601>); for example, with sRGB input values and range of 0 . . . 255). In some implementations, if the image has an alpha channel, then pixels that are transparent (e.g., alpha below 50%) are ignored. In some implementations, pixels that are sufficiently close to black, or to white, (e.g., Y<20 or Y>240) may be ignored.

Then, for all the remaining pixels, the following operations may be performed:

The value LM is computed as: if L>M then LM=(LMR+√(L−M))*5/LMR, otherwise LM=(LMR−√(M−L))*5/LMR.

The value S'=γ(S)*3 is computed, where γ is the sRGB transfer function.

The value Y'=Y/64 is computed.

The counter c [LM] [S'] [Y'] is incremented, where LM, S' and Y' are rounded down. If S' and/or Y' are within 0.2 of an integer number n, then the counters for both n−1 and n are incremented.

The counter p is incremented.

The GCA score is then computed, for example, as being equal to:

$$\sum_{s=0}^{2}\sum_{y=0}^{3}\sum_{i=0}^{9}\sum_{j=0}^{i-1}\frac{2(i-j)^2\sqrt{c[i][s][y]c[j][s][y]}}{81p}$$

For example, the GCA score is determined as being equal to: the sum, for all combinations of values of s from 0 to 2, of y from 0 to 3, of i from 0 to 9, and of j from 0 to (i−1), of the product of: (A) twice of the squared difference between i and j, and (B) the square root of the product of c[i][s][y] and c[i][s][y], wherein said product of (A) and (B) is divided by (81 times p).

In some implementations, The GCA score is zero (or close to zero, or near zero), if the analyzed image has no GCA. The GCA score increases as there are more pairs of pixels in the analyzed image which can be easily distinguished by persons that are not colorblind and which cannot be distinguished (easily, or at all) by persons that are colorblind (e.g., whose Long cone and Medium cone are damaged or mutated. For example, for a pair of pixels that can be distinguished easily by a non-colorblind person, the value of $(i-j)^2$ is large; and as both the Long cone and the Medium cone work well for such person, these colors can be distinguished). Conversely, for a pair of pixels that cannot be distinguished (easily, or at all) by a colorblind person, the S and Y values are similar, but the color differentiation is performed by the different stimulation of the Long and Medium cones, which are often damaged or mutated at a color-blind person. Accordingly, the GCA score generation may be based on the number (or ratio) of the pairs of pixels that require color differentiation based on the difference in stimulation of the Long cone and the Medium cone.

In some embodiments, the LCA Score Generator 121 may operate in accordance with the following method or set of operations. Firstly, the method performs downscaling of the image that is intended for analysis, by a pre-determined factor; such as, by a factor of 4; and a particular Gaussian blur is applied (e.g., using Sigma=2). Then, the downscaled image is converted from RGB color-space to LMS color space, using Hunt-Pointer-Estevez transformation (e.g., with a range of 0 . . . 1).

Then, from the three LMS channels, multiple image-versions are produced, such as four image-versions denoted C1, C2, C3 and C4, using the following rules:

$C1=(L-M)/K$, wherein $K$ is a pre-defined constant, such as $K=0.158618$;

$C2=(L+M)/2$;

$C3=S$;

$C4=M-S$.

Then, a discrete Laplacian operator is applied to these four image-versions C1, C2, C3 and C4. Then, each one of the image-versions is multiplied (element-wise) by a pre-defined constant value; for example, image-version C1 is (element-wise) multiplied by constant K1, wherein K1 may be for example 15; image-version C2 is (element-wise) multiplied by constant K2, wherein K2 may be for example 25; image-version C3 is (element-wise) multiplied by constant K3, wherein K3 may be for example 20; image-version C4 is (element-wise) multiplied by constant K4, wherein K4 may be for example 25.

Then, each of the four image-versions C1, C2, C3 and C4, is squared (element-wise); and the result is then morphologically dilated with a 3×3 cross kernel, and clamped to the range of 0 . . . 1.

Then, LCA heatmaps are constructed to reflect or to indicate particular regions or zones within each image-version that are estimated to trigger a difficulty for colorblind viewers. For example, a LCA heatmap, denoted H, is constructed by:

$H=C1-C2-C3-C4$.

The LCA heatmap (H) is clamped to the range of 0 . . . 1. Values above zero indicate image-regions at which viewers having normal vision (non-colorblind persons) are able to see (e.g., immediately or without difficulty) an edge or a contour or a border (e.g., since C1>0), yet colorblind viewers are not able to do so (e.g., since C2+C3+C4 is small).

This LCA heatmap (H) is then downscaled by a pre-defined factor (e.g., by a factor of 2), and a Gaussian blur is applied (e.g., with Sigma=2).

The LCA score of the image may then be computed, for example as:

$LCAscore=5*(max(H)+average(H))$

The CCA Score Generator 123 operates, in some embodiments, by summing together the LCA score and the GCA score of an image. In other embodiments, the CCA score may be generated in other methods or based on other calculations or a weighted formula. For example, some implementations may be configured to be more sensitive to LCA rather than to GCA, and therefore the CCA score may be, for example, the GCA score plus N times the LCA score, wherein N is a number greater than one. Other implementations may be configured to be more sensitive to GCA rather than to LCA, and therefore the CCA score may be, for example, the LCA score plus N times the GCA score, wherein N is a number greater than one. Other formulas may be used.

In some embodiments, the CCA score may be utilized as part of a tool that improves the accessibility of a website, a web-page, a content-item, a video, an image, an application, a set of Graphic User Interface (GUI) elements, or the like. For example, an image editing application or platform, such as Adobe® Photoshop®, or other Content Authoring/Editing Application 141, may utilize a CCA generator which may be implemented as a built-in feature or function, or as an add-on or plug-in or extension; such that upon performing a Save operation or an Export operation or a Publish operation or a Check-In operation to an image, the application or the platform may automatically determine and generate the CCA score of the image, and may optionally provide an alert message or a warning notification (e.g., "Attention, the image that you have just Saved suffers from excessive color ambiguity which may be problematic for colorblind viewers"); and/or may optionally suggest, or automatically perform, one or more image modification operations in order to reduce the CCA of that image. In some embodiments, optionally, the application or platform may temporarily duplicate the user's image and may perform one or more operations on the duplicate copy prior to generating the CCA of the image; for example, the application or platform may automatically "flatten the image" if it has multiple layers, or may convert a vector graphic image into a bitmap image, or the like.

Similarly, the CCA score generation, as well as warning messages and/or remedial operations, may be implemented as a feature or a function of an application or a platform for web development, or for authoring or developing web sites or web-pages or other web content; or as a feature or function of an application or a platform for creating or editing presentations or slides, or word processing documents, or spreadsheets (e.g., particularly in conjunction with generation of multiple-color graphs and charts, such as pie charts, bar charts, line graphs, or the like).

Similarly, the CCA score generation, as well as warning messages and/or remedial operations, may be implemented as a feature or a function of a stand-alone device that is able to capture or generate images or video or content, such as, a digital camera, a Digital Single-Lens Reflex (DSLR) camera, a smartphone or tablet or smart-watched equipped with a camera, or other electronic device equipped with a camera, a scanner (e.g., a flatbed scanner), a copy machine or a copying machine, an image duplication machine, a multi-purpose printer or an all-in-one printer capable of scanning images, or other type of Image-Capturing/Video-Capturing Unit 142. For example, the user of such device may capture a still image of a real-life banner that he sees, with an intention to later share this image with friends or with an intention to later publish or post this image online. The capturing device may locally perform, within the device itself and without requiring communication with a remote server or a remote device, the CCA score generation; and may immediately generate a warning message to the user, such as via a message displayed on a digital screen of the camera or the device, or via an audible message, indicating that the freshly-captured image (or video) is estimated to be problematic for colorblind persons. Optionally, such device may further perform locally, or may propose to the user to perform locally, one or more remedial operations via one or more filters or image modification or image editing tools or functions that may be installed on such camera or device, similar to a manner in which a user that has just captured an image is able to perform therein basic crop operations.

Similarly, the CCA score generation, as well as warning messages and/or remedial operations, may be implemented as a feature or a function of a social networking website or webpage or application or "app" or platform, or as part of a content sharing platform, or as part of a messaging or Instant Messaging (IM) application which may be a one-to-one messaging application or a one-to-many or a many-to-many messaging application, an electronic mail (email) or web-mail application or platform, or other suitable Social Networking/Sharing/Messaging/Publishing Application 143. For example, a user that uploads an image to a social network or similar online venue (e.g., Facebook®, or Twitter®, or Pinterest®, or Instagram®, or Flickr®, or LinkedIn®, or the like), may trigger a generation of the CCA score for that score, locally on the user's device (e.g., as part of a client-side "app" of that platform) and/or remotely on a remote server of that platform; and the generated CCA score, if greater than a threshold value, may cause further generation of a warning message to the user, and/or may trigger the automatic or manual applying of one or more remedial operations. Some embodiments may thus provide a warning to a user, just before he actually shares a freshly-captured photograph with hundreds of friends on a social networking platform, or just as he commands to share an image (that he created or obtained) with dozens of colleagues via a WhatsApp® group, or the like.

Similarly, the CCA score generation, as well as warning messages and/or remedial operations, may be implemented as a feature or a function of a web-browser, or of an application for browsing or viewing photos or images (similar to a "Gallery" application on a smartphone). For example, user David may be a color-blind person, who browses the Internet and consumes content via a Web Browser 144, that may be equipped with a "CCA Score Generator" add-on or plug-in or extension 145, or as a built-in feature of the web browser itself. For every web-page that is loaded or parsed or displayed, the CCA Score Generator function may generate CCA scores for every image that was loaded; not necessarily as a condition for displaying the images, but rather, once the web-page was already parsed and displayed and while user David is in the process of reading or viewing or consuming the digital content. For example, user David reads an article on CNN.com or on WSJ.com or on NYTimes.com, the article having 600 words of text and 5 color images; while user David is reading, his web-browser generates a notification to him (e.g., a pop-up notification, or an overlay layer notification, or an audible notification), indicating to him that the second image on that web-page has an excessive CCA score and is estimated to be problematic for color-blind viewers. Furthermore, the web-browser may offer to replace that particular image with an alternate version, that may be automatically prepared locally by the web-browser or remotely by a remote server that the web-browser has approached for this purpose, such that user David would be able to see a replacement version of the problematic image.

In some embodiments, optionally, a right-click of the user on any particular image on any website, may cause the web browser 144 to open a right-click menu that includes a user-selectable option of "Show me a colorblind-friendly version of this image", regardless of the CCA score of that image (or, only for images that have a non-zero CCA score; or, only for images that have a CCA score that is greater than a pre-defined threshold value). Upon selection of such command by the user, the web-browser may generate such modified version of the selected image (e.g., locally by the web-browser, or remotely via a remote server), and may replace the original image with the modified (colorblind friendly) version that was prepared.

In some embodiments, the user of the web browser 144 may be able to request such replacement globally for an entire web-page, such as, by selecting from the menu of the web-browser "Replace all the images on this web-page with colorblind-friendly versions", and the web-browser may automatically perform such replacement of all images on the web-page with modified versions. In some embodiments, the user may be able to request such replacement even more globally, with regard to an entire website or domain or subdomain (e.g., "whenever I visit CNN.com, please replace all images with colorblind-friendly versions"), or even with regard to any website or any webpage or any content.

In some embodiments, similar functionality may be integrated into (or may be a plug-in or add-on or extension for) an image viewing application or a content browsing application or an Image Organizer Application 146, such as Adobe® Photoshop® Album®, or ACDSee®, or Apple® Aperture®, or Google® Photos, or the like. For example, user Eve may utilize such application to browse hundreds of images that are stored locally and/or remotely, e.g., as he looks for an image of a birthday cake to insert into a greeting card that she would like to create. The image viewer or image organizer may generate CCA scores for an image that user Eve is currently viewing, or for each one of the images in the folder or repository that is being browsed; and may generate notifications or alert messages if the CCA score of a particular image is excessively high. Optionally, such images may be automatically tagged by the application as "colorblind unfriendly image" or as a "color ambiguous image" or with other suitable tag(s) or descriptors.

Some embodiments, particularly those that are configured to operate in conjunction with a Spreadsheet Application 151 (e.g., Microsoft® Excel® or similar) or with a Presentation Application 152 (e.g., Microsoft® PowerPoint® or similar), or with a Word Processing Application 153 (e.g., Microsoft® Word® or similar, which may be utilized for creating or embedding color graphics in a word processing document), may further be adapted to specifically detect charts and infographic that may suffer from color ambiguity, which may be automatically cured or remedied or modified automatically by such application. For example, such applications may be configured such that upon creation of an infographic or a chart (e.g., a pie chart, a bar chart, a line graph, or the like), the application automatically and/or autonomously analyzes the generated infographic or chart, and generates its CCA score; and proposes a modified version or a replacement version, which may be implemented by color replacement (e.g., change a pie chart of red-and-green slices over a white background, to blue-and-pink slices over a white background) and/or by texture insertion or patterning (e.g., replace a solid green slice of a pie chart, with a green slice having horizontal black lines; and replace a neighboring solid red slice of that pie chart, with a red slice having vertical black lines).

In some embodiments, such features or functionality may be available not only to the creator or publisher of the presentation or spreadsheet, but also to the viewer himself. For example, user Adam has created a presentation of 25 slides, which includes several pie charts and bar charts that are not colorblind-friendly, or that suffer from excessive color ambiguity. User Adam sends this presentation to user Bob, who in turn needs to display it in a conference room when he lectures to an audience of 200 persons. User Bob may command the presentation display application, that instead of presenting the presentation "as is", the presentation application should automatically generate a colorblind-friendly version that would be presented to the audience instead of the original presentation; thereby addressing the needs of any colorblind persons in the audience; as user Bob may estimate that statistically, out of the 200 audience members, 100 are expected to be males, and 8 viewers are expected to be colorblind to some degree.

In some embodiments, optionally, the system may generate and/or utilize an Illustration Score, indicating whether a particular image or content-item is more closely resembling a photograph of a real-life object or is more closely resembling a drawing or illustration; and such score may be utilized as a heuristic or an indicator for detect non-photographic images, such as infographics or charts, which may then be analyzed for color ambiguity.

For demonstrative purposes, some portions of the discussion above or herein may relate to analysis or handling of an "image"; however, embodiments of the present invention may be utilized with other types of content-items, for example, a video, a video frame, a video file, a stream of video packets, an MP4 video, an H.264 video, an MPEG-4 Part 10 video, an Advanced Video Codec (AVC or MPEG-4 AVC) video, an H.265 video, an MPEG-H Part 2 video, a High Efficiency Video Coding (HEVC) video, a WebM video, an AVI video, an AV1, video, a MOV video, an MKV video or a Matroska video, a container for VP8 or VP9 or AV1 video or for other types of video compression or video encoding, a video or image or frame stored with lossless compression or lossless encoding, a video or image or frame stored with lossy compression or lossy encoding, a video segment, an advertising or marketing video, a bitmap image, a vector graphic image, a representation of a three-dimensional model, a multimedia or "rich media" file or content-item, an animation sequence (e.g., an Animated GIF or a WebP image or animated image), a cinemagraph having subtle or minimal or partial animation, an infographic, a PDF file or document, a text file or a word processing document (e.g., detecting color ambiguity of a Microsoft® Word® document having green text on red background), a spreadsheet file or a presentation file (e.g., detecting therein a red text on a green background, and/or detecting therein charts or graphical elements that may be problematic for colorblind persons to view), and/or other types of content-items that include or comprise a visual component, and/or from which a discrete visual component may be extracted or rendered or saved or copied or exported (e.g., a frame extracted from a video file, a frame extracted from an Animated GIF or from other animation sequences or rich media content, a bitmap version of a vector graphics file or model, a still image of a view of a three-dimensional model). In some embodiments, for example, a video file of 5 seconds at 30 FPS, may be converted into 150 still images which may be analyzed (each one by itself) for color ambiguity; similarly, a Microsoft® Word® word processing document of 20 pages may be analyzed as (for example) 20 discrete images, each image corresponding to one page of the original document, or may be analyzed (for example) as 12 discrete images which correspond to 12 images that were inserted or embedded into the word processing document; or the like.

In some embodiments, in order to perform the computerized operations of system 100, such system may be equipped with relevant hardware components and/or software components, for example: a processor 171 able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit 172 able to store data for short term (e.g., Random Access Memory (RAM), volatile memory); a storage unit 173 able to store data for long term (e.g., non-volatile memory, Flash memory, hard disk drive, solid state drive, optical drive); an input unit 174 able to receive user's input (e.g., keyboard, keypad, mouse, touch-pad, touch-screen, trackball, microphone); an output unit 175 able to generate or produce or provide output (e.g., screen, touch-screen, monitor, display unit, audio speakers); one or more transceivers 176 or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a system comprises: a color ambiguity score generator, to perform analysis of an image, and to determine a color ambiguity score that quantitively indicates a level of color ambiguity that said image is estimated to cause when viewed by a user having color vision deficiency.

In some embodiments, the system further comprises: a local color ambiguity score generator, to perform analysis of said image, and to generate a local color ambiguity score that quantitively indicates a level of local color ambiguity between (i) an in-image object and (ii) an in-image foreground of said in-image object; wherein the color ambiguity score generator generates said color ambiguity score by utilizing a formula that uses at least said local color ambiguity score.

In some embodiments, the system further comprises: a global color ambiguity score generator, to perform analysis of said image, and to generate a global color ambiguity score that quantitively indicates a level of global color ambiguity between (I) a first in-image object within said image and (II) a second in-image object within said image; wherein the color ambiguity score generator generates said color ambiguity score by utilizing a formula that uses at least said global color ambiguity score.

In some embodiments, the system comprises: a local color ambiguity score generator, to perform analysis of said image, and to generate a local color ambiguity score that quantitively indicates a level of local color ambiguity between (i) an in-image object and (ii) an in-image foreground of said in-image object; and a global color ambiguity score generator, to perform analysis of said image, and to generate a global color ambiguity score that quantitively indicates a level of global color ambiguity between (I) a first in-image object within said image and (II) a second in-image object within said image; wherein the color ambiguity score generator generates said color ambiguity score by utilizing a formula that uses both (A) said local color ambiguity score and (B) said global color ambiguity score.

In some embodiments, the system further comprises: an image characteristics extractor unit, to extract one or more attributes of said image, from at least one of: (I) content depicted in said image (II) meta-data of said image; a score adjusting unit, to modify the color ambiguity score that was determined by the color ambiguity score, based on said one or more attributes of said image.

In some embodiments, the system comprises: a color ambiguity mitigation unit, to automatically generate at least one replacement version for said image, by applying one or more image modification processes to said image; wherein said replacement version has a lower level of color ambiguity relative to said image.

In some embodiments, the system comprises: a patterning and texturing unit, to automatically generate at least one replacement version for said image, by adding a pattern or a texture to a particular portion within said image; wherein said replacement version has a lower level of color ambiguity relative to said image.

In some embodiments, the system comprises: an image modification unit, to automatically generate at least one replacement version for said image, by modifying a level of contrast or a level of brightness of said image; wherein said replacement version has a lower level of color ambiguity relative to said image.

In some embodiments, the system comprises: an image modification unit, to automatically generate at least one replacement version for said image, by modifying a color saturation of at least one color in said image; wherein said replacement version has a lower level of color ambiguity relative to said image.

In some embodiments, the system comprises: an image modification unit, to automatically generate at least one replacement version for said image, by replacing a first particular color in said image with a second, different, particular color; wherein said replacement version has a lower level of color ambiguity relative to said image.

In some embodiments, the system comprises: an image modification unit, to automatically generate at least one replacement version for said image, by inserting an in-image space between two particular in-image objects that are depicted in said image; wherein said replacement version has a lower level of color ambiguity relative to said image.

In some embodiments, the system comprises: a color ambiguity mitigation unit, to automatically trigger one or more color ambiguity mitigation processes if said color ambiguity score of said image is greater than a pre-defined threshold value.

In some embodiments, the system comprises: a color ambiguity mitigation unit, to automatically trigger one or more color ambiguity mitigation processes if said color ambiguity score of said image is greater than a pre-defined threshold value; wherein said mitigation processes comprise at least: triggering an alert notification generator to generate and send a color ambiguity alert notification to an entity that submitted said image to a repository of images.

In some embodiments, the system comprises: a color ambiguity mitigation unit, to automatically trigger one or more color ambiguity mitigation processes if said color ambiguity score of said image is greater than a pre-defined threshold value; wherein said mitigation processes comprise at least: automatically generating at least one replacement image for said image, wherein the replacement image has reduced color ambiguity relative to said image; and automatically storing said replacement image in a sub-system that was intended to utilize said image such that the replacement image would be utilized by said sub-system instead of said image.

In some embodiments, the system comprises: a color ambiguity mitigation unit, to automatically trigger one or more color ambiguity mitigation processes if said color ambiguity score of said image is greater than a pre-defined threshold value; wherein said mitigation processes comprise at least: (a) automatically generating a plurality of replacement images for said image, based on a respective plurality of image modification processes; (b) generating color ambiguity scores for each of said replacement images; (c) selecting from said replacement images, a particular replacement image having the lowest color ambiguity score; (d) providing said particular replacement image to a sub-system that was intended to utilize said image, such that said particular replacement image would be utilized by said sub-system instead of said image.

In some embodiments, the system comprises: a color ambiguity mitigation unit, to automatically trigger one or more color ambiguity mitigation processes if said color ambiguity score of said image is greater than a pre-defined threshold value; wherein said mitigation processes comprise at least: (a) automatically generating a plurality of replacement images for said image, based on a respective plurality of image modification processes; (b) presenting to a user said plurality of replacement images; (c) receiving from said user a user-selection of one particular replacement image that said user prefers from said plurality of image modification processes; (d) providing said one particular replacement image to a sub-system that was intended to utilize said image, such that said one particular replacement image would be utilized by said sub-system instead of said image.

In some embodiments, the system comprises: a repository scanning unit, (a) to batch analyze each image of a plurality of images that are stored in a repository, and (b) to generate a color ambiguity score for each image of said plurality of image, and (c) to generate an analytics report indicating at least a group of images having color ambiguity scores that are in a pre-defined range of values.

In some embodiments, the system comprises a web browser that parses and displays web content to a user; wherein said web browser utilizes said color ambiguity score generator to automatically determine color ambiguity scores for content-items that are viewed via said web browser; wherein said web browser generates an alert notification to said user, indicating that a particular content-item that is viewed has excessive level of color ambiguity.

In some embodiments, the system comprises: a web browser that parses and displays web content to a user; wherein said web browser utilizes said color ambiguity score generator to automatically determine color ambiguity scores for content-items that are viewed via said web browser; wherein said web browser is to automatically replace, (i) a content-item having a color ambiguity score that is greater than a pre-defined threshold value, with (ii) an automatically-generated modified-version of said content-item which has as smaller color ambiguity score relative to that content-item.

In some embodiments, the system comprises: an image editing platform that enables a user to edit images; wherein said image editing platform utilizes said color ambiguity score generator to automatically determine color ambiguity scores for images that are edited via said image editing platform; wherein said image editing platform generates an alert notification to said user, indicating that a particular image that was edited or viewed via said image editing platform has excessive level of color ambiguity.

In some embodiments, the system comprises: an image organizing platform that enables a user to browse and view images; wherein said image organizing platform utilizes said color ambiguity score generator to automatically determine color ambiguity scores for images that are browsed or viewed via said image organizing platform; wherein said image organizing platform generates an alert notification to said user, indicating that a particular image that was browsed or viewed via said image organizing platform has excessive level of color ambiguity.

In some embodiments, the system comprises: a presentation authoring platform that enables a user to author and edit a presentation; wherein said presentation authoring platform utilizes said color ambiguity score generator to automatically determine color ambiguity scores for images that are embedded in said presentation; wherein said presentation authoring platform generates an alert notification to said user, indicating that a particular image that was embedded in said presentation via said presentation authoring platform has excessive level of color ambiguity.

In some embodiments, the system comprises: a spreadsheet editing platform that enables a user to author and edit a spreadsheet and to generate graphs from spreadsheet data; wherein said spreadsheet editing platform utilizes said color ambiguity score generator to automatically determine color ambiguity scores for graphs that are part of said spreadsheet; wherein said spreadsheet editing platform generates an alert notification to said user, indicating that a particular image that is part of said spreadsheet has excessive level of color ambiguity.

In some embodiments, the system comprises: a word processing platform that enables a user to author and edit a word processing document that includes colored text or colored images; wherein said word processing platform utilizes said color ambiguity score generator to automatically determine color ambiguity scores for colored content that is included in said word processing document; wherein said word processing platform generates an alert notification to said user, indicating that a particular colored content that is part of said word processing document has excessive level of color ambiguity.

In some embodiments, the system comprises: a Portable Document Format (PDF) inspection platform that enables a user to (at least) view (and optionally, to create and/or edit and/or modify) a PDF file; wherein said PDF inspection platform utilizes said color ambiguity score generator to automatically determine color ambiguity scores for images that are included in said PDF file; wherein said spreadsheet editing platform generates an alert notification to said user, indicating that a particular image that is part of said PDF file has excessive level of color ambiguity.

In some embodiments, the system comprises: a camera to capture said image; wherein images that are captured by said camera, are fed into said color ambiguity score generator to automatically determine color ambiguity scores for said images; wherein the system generates an alert notification to said user, indicating that a particular image that was captured by said camera has excessive level of color ambiguity.

In some embodiments, the system comprises: an image sharing platform that enables a user to share or to publish images to one or more third parties; wherein said image sharing platform utilizes said color ambiguity score generator to automatically determine color ambiguity scores for images that said user requested to share or publish, prior to sharing or publishing said images; wherein said image sharing platform generates an alert notification to said user, indicating that a particular image that said user requested to share or to publish, has excessive level of color ambiguity.

In some embodiments, at least one of (i) the color ambiguity score generator, (ii) the local color ambiguity score generator, and (iii) the global color ambiguity score generator, performs a particular pre-defined transformation of said image from a red-green-blue (RGB) color-space to a long-medium-short (LMS) color-space; and wherein an LMS-transformed representation of said image is utilized for determining at least one of (I) the color ambiguity score, (II) the local color ambiguity score, and (III) the global color ambiguity score.

In some embodiments, at least one of (i) the color ambiguity score generator, (ii) the local color ambiguity score generator, and (iii) the global color ambiguity score generator, operates by detecting a pair of image-portions that are differentiated by different stimulation of a Long photoreceptor cone cell and a Medium photoreceptor cone cell of a viewer.

In some embodiments, said image is one of: a photograph, a drawing, an illustration, an infographic, a frame that is extracted from a video, a frame that is extracted from an animation sequence, a frame that is extracted from a cinemagraph of an animated GIF, a page or a portion of a word processing document, a slide of a presentation, a portion of a slide of a presentation, a graph within a spreadsheet file, a page of a PDF file, a portion of a page of a PDF file, a frame that was captured from a streaming video or from a video-stream, or the like.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
   (a) a color ambiguity score generator, to perform analysis of an image, and to determine a color ambiguity score that quantitively indicates a level of color ambiguity that said image is estimated to cause when viewed by a user having color vision deficiency;
   (b) a local color ambiguity score generator, to perform analysis of said image, and to generate a local color ambiguity score that quantitively indicates a level of local color ambiguity between (i) an in-image object and (ii) an in-image foreground of said in-image object;
   (c) a global color ambiguity score generator, to perform analysis of said image, and to generate a global color ambiguity score that quantitively indicates a level of global color ambiguity between (I) a first in-image object within said image and (II) a second in-image object within said image;
   wherein the color ambiguity score generator generates said color ambiguity score by utilizing a formula that uses both (A) said local color ambiguity score and (B) said global color ambiguity score;
   (d) a color ambiguity mitigation unit, to automatically generate at least one replacement version for said image, by applying one or more image modification processes to said image, wherein said replacement version has a lower level of color ambiguity relative to said image.

2. The system of claim 1, further comprising:
an image characteristics extractor unit, to extract one or more attributes of said image, from at least one of: (I) content depicted in said image (II) meta-data of said image;
a score adjusting unit, to modify the color ambiguity score that was determined by the color ambiguity score, based on said one or more attributes of said image.

3. The system of claim 1 further comprising: a patterning and texturing unit, to automatically generate at least one replacement version for said image, by adding a pattern or a texture to a particular portion within said image.

4. The system of claim 1 further comprising: an image modification unit, to automatically generate the at least one replacement version for said image, by modifying a level of contrast or a level of brightness of said image.

5. The system of claim 1 further comprising: an image modification unit, to automatically generate the at least one replacement version for said image, by modifying a color saturation of at least one color in said image.

6. The system of claim 1,
wherein said color ambiguity mitigation unit is configured to automatically trigger one or more color ambiguity mitigation processes if said color ambiguity score of said image is greater than a pre-defined threshold value.

7. The system of claim 1,
wherein said color ambiguity mitigation unit is configured to automatically trigger one or more color ambiguity mitigation processes if said color ambiguity score of said image is greater than a pre-defined threshold value;
wherein said mitigation processes comprise at least: triggering an alert notification generator to generate and send a color ambiguity alert notification to an entity that submitted said image to a repository of images.

8. The system of claim 1 wherein said color ambiguity mitigation unit is configured to automatically trigger one or more color ambiguity mitigation processes if said color ambiguity score of said image is greater than a pre-defined threshold value; wherein said mitigation processes comprise at least: automatically storing said replacement image in a sub-system that was intended to utilize said image such that the replacement image would be utilized by said sub-system instead of said image.

9. The system of claim 1,
wherein said color ambiguity mitigation unit is configured to automatically trigger one or more color ambiguity mitigation processes if said color ambiguity score of said image is greater than a pre-defined threshold value;
wherein said mitigation processes comprise at least:
(a) automatically generating a plurality of replacement images for said image, based on a respective plurality of image modification processes;
(b) generating color ambiguity scores for each of said replacement images;
(c) selecting from said replacement images, a particular replacement image having the lowest color ambiguity score;
(d) providing said particular replacement image to a sub-system that was intended to utilize said image, such that said particular replacement image would be utilized by said sub-system instead of said image.

10. The system of claim 1,
wherein said color ambiguity mitigation unit is configured to automatically trigger one or more color ambiguity mitigation processes if said color ambiguity score of said image is greater than a pre-defined threshold value;
wherein said mitigation processes comprise at least:
(a) automatically generating a plurality of replacement images for said image, based on a respective plurality of image modification processes;
(b) presenting to a user said plurality of replacement images;
(c) receiving from said user a user-selection of one particular replacement image that said user prefers from said plurality of image modification processes;
(d) providing said one particular replacement image to a sub-system that was intended to utilize said image, such that said one particular replacement image would be utilized by said sub-system instead of said image.

11. The system of claim 1, further comprising:
a repository scanning unit, (a) to batch analyze each image of a plurality of images that are stored in a repository, and (b) to generate a color ambiguity score for each image of said plurality of image, and (c) to generate an analytics report indicating at least a group of images having color ambiguity scores that are in a pre-defined range of values.

12. The system of claim 1,
wherein the system comprises a web browser that parses and displays web content to a user;
wherein said web browser utilizes said color ambiguity score generator to automatically determine color ambiguity scores for content-items that are viewed via said web browser;
wherein said web browser generates an alert notification to said user, indicating that a particular content-item that is viewed has excessive level of color ambiguity.

13. The system of claim 1,
wherein the system comprises a web browser that parses and displays web content to a user;
wherein said web browser utilizes said color ambiguity score generator to automatically determine color ambiguity scores for content-items that are viewed via said web browser;
wherein said web browser is to automatically replace, (i) a content-item having a color ambiguity score that is greater than a pre-defined threshold value, with (ii) an automatically-generated modified-version of said content-item which has as smaller color ambiguity score relative to that content-item.

14. The system of claim 1,
wherein the system comprises an image editing platform that enables a user to edit images;
wherein said image editing platform utilizes said color ambiguity score generator to automatically determine color ambiguity scores for images that are edited via said image editing platform;
wherein said image editing platform generates an alert notification to said user, indicating that a particular image that was edited or viewed via said image editing platform has excessive level of color ambiguity.

15. The system of claim 1,
wherein the system comprises an image organizing platform that enables a user to browse and view images;
wherein said image organizing platform utilizes said color ambiguity score generator to automatically determine color ambiguity scores for images that are browsed or viewed via said image organizing platform;
wherein said image organizing platform generates an alert notification to said user, indicating that a particular image that was browsed or viewed via said image organizing platform has excessive level of color ambiguity.

16. The system of claim 1,
wherein the system comprises a presentation authoring platform that enables a user to author and edit a presentation;
wherein said presentation authoring platform utilizes said color ambiguity score generator to automatically determine color ambiguity scores for images that are embedded in said presentation;
wherein said presentation authoring platform generates an alert notification to said user, indicating that a particular image that was embedded in said presentation via said presentation authoring platform has excessive level of color ambiguity.

17. The system of claim 1,
wherein the system comprises a spreadsheet editing platform that enables a user to author and edit a spreadsheet and to generate graphs from spreadsheet data;
wherein said spreadsheet editing platform utilizes said color ambiguity score generator to automatically determine color ambiguity scores for graphs that are part of said spreadsheet;
wherein said spreadsheet editing platform generates an alert notification to said user, indicating that a particular image that is part of said spreadsheet has excessive level of color ambiguity.

18. The system of claim 1,
wherein the system comprises a word processing platform that enables a user to author and edit a word processing document that includes colored text or colored images;
wherein said word processing platform utilizes said color ambiguity score generator to automatically determine color ambiguity scores for colored content that is included in said word processing document;
wherein said word processing platform generates an alert notification to said user, indicating that a particular colored content that is part of said word processing document has excessive level of color ambiguity.

19. The system of claim 1,
wherein the system comprises a Portable Document Format (PDF) inspection platform that enables a user to view a PDF file;
wherein said PDF inspection platform utilizes said color ambiguity score generator to automatically determine color ambiguity scores for images that are included in said PDF file;
wherein said PDF inspection platform generates an alert notification to said user, indicating that a particular image that is part of said PDF file has excessive level of color ambiguity.

20. The system of claim 1,
wherein the system comprises a camera to capture said image;
wherein images that are captured by said camera, are fed into said color ambiguity score generator to automatically determine color ambiguity scores for said images;
wherein the system generates an alert notification to a user, indicating that a particular image that was captured by said camera has excessive level of color ambiguity.

21. The system of claim 1,
wherein the system comprises an image sharing platform that enables a user to share or to publish images to one or more third parties;
wherein said image sharing platform utilizes said color ambiguity score generator to automatically determine color ambiguity scores for images that said user requested to share or publish, prior to sharing or publishing said images;
wherein said image sharing platform generates an alert notification to said user, indicating that a particular image that said user requested to share or to publish, has excessive level of color ambiguity.

22. The system of claim 1,
wherein at least one of (i) the color ambiguity score generator, (ii) the local color ambiguity score generator, and (iii) the global color ambiguity score generator, performs a particular pre-defined transformation of said image from a red-green-blue (RGB) color-space to a long-medium-short (LMS) color-space; and wherein an LMS-transformed representation of said image is utilized for determining at least one of (I) the color ambiguity score, (II) the local color ambiguity score, and (III) the global color ambiguity score.

23. The system of claim 1,
wherein at least one of (i) the color ambiguity score generator, (ii) the local color ambiguity score generator, and (iii) the global color ambiguity score generator, operates by detecting a pair of image-portions that are differentiated by different stimulation of a Long photoreceptor cone cell and a Medium photoreceptor cone cell of a viewer.

24. The system of claim 1,
wherein said image is one of:
a photograph, a drawing, an illustration, an infographic,
a frame that is extracted from a video file,
a frame that is extracted or captured from a streaming video,
a frame that is extracted from an animation sequence,
a frame that is extracted from a cinemagraph,
a page or a portion of a word processing document,
a slide of a presentation,
a portion of a slide of a presentation,
a graphical item within a spreadsheet file,
a page of a PDF file,
a portion of a page of a PDF file.

25. A system comprising:
(a) a color ambiguity score generator, to perform analysis of an image, and to determine a color ambiguity score that quantitively indicates a level of color ambiguity that said image is estimated to cause when viewed by a user having color vision deficiency;
(b) a local color ambiguity score generator, to perform analysis of said image, and to generate a local color ambiguity score that quantitively indicates a level of local color ambiguity between (i) an in-image object and (ii) an in-image foreground of said in-image object;
(c) a global color ambiguity score generator, to perform analysis of said image, and to generate a global color ambiguity score that quantitively indicates a level of global color ambiguity between (I) a first in-image object within said image and (II) a second in-image object within said image;
wherein the color ambiguity score generator generates said color ambiguity score by utilizing a formula that uses both (A) said local color ambiguity score and (B) said global color ambiguity score;
(d) an image modification unit, to automatically generate at least one replacement version for said image, by replacing a first particular color in said image with a second, different, particular color, wherein said replacement version has a lower level of color ambiguity relative to said image.

26. A system comprising:

(a) a color ambiguity score generator, to perform analysis of an image, and to determine a color ambiguity score that quantitively indicates a level of color ambiguity that said image is estimated to cause when viewed by a user having color vision deficiency;

(b) a local color ambiguity score generator, to perform analysis of said image, and to generate a local color ambiguity score that quantitively indicates a level of local color ambiguity between (i) an in-image object and (ii) an in-image foreground of said in-image object;

(c) a global color ambiguity score generator, to perform analysis of said image, and to generate a global color ambiguity score that quantitively indicates a level of global color ambiguity between (I) a first in-image object within said image and (II) a second in-image object within said image;

wherein the color ambiguity score generator generates said color ambiguity score by utilizing a formula that uses both (A) said local color ambiguity score and (B) said global color ambiguity score;

(d) an image modification unit, to automatically generate at least one replacement version for said image, by inserting an in-image space between two particular in-image objects that are depicted in said image, wherein said replacement version has a lower level of color ambiguity relative to said image.

* * * * *